Feb. 29, 1944. S. K. WELLMAN 2,342,773
LANDING PLATFORM FOR AIRPLANES
Filed March 28, 1942 2 Sheets-Sheet 2
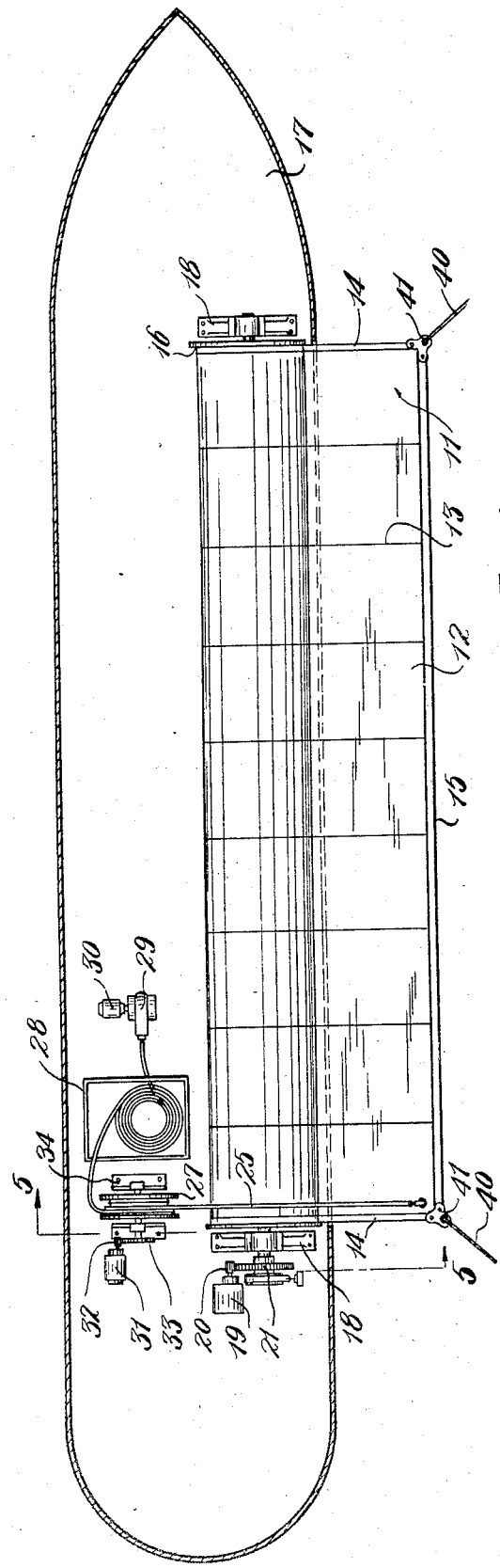
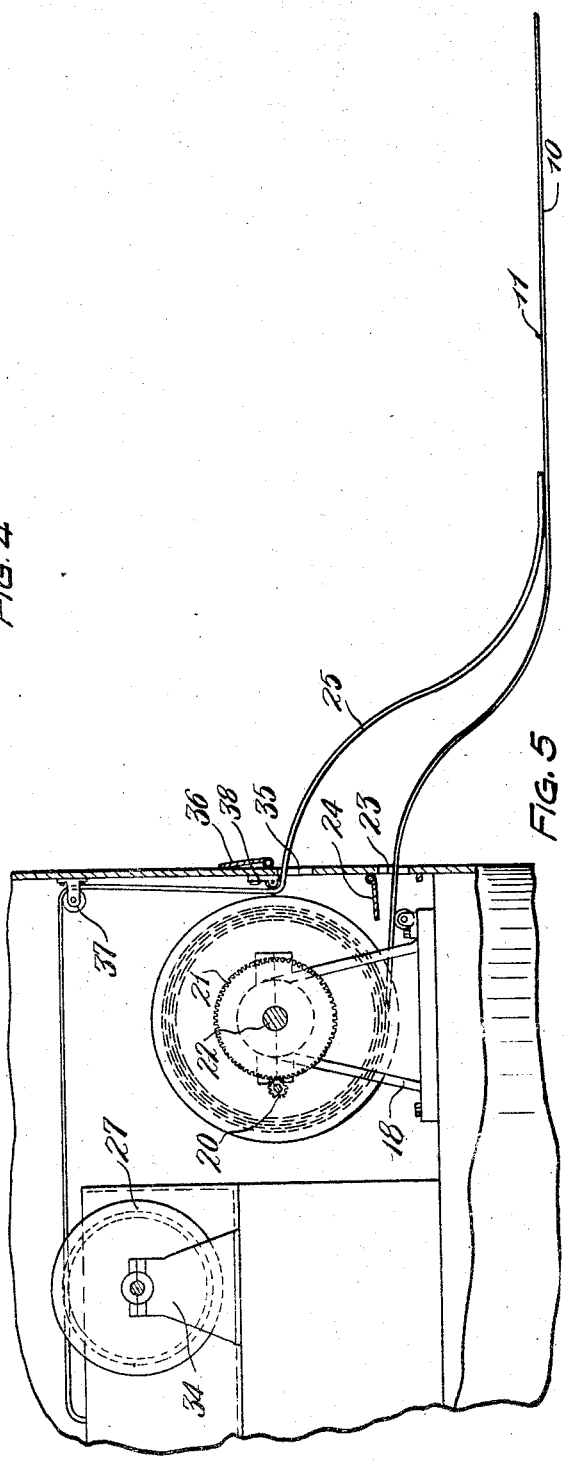
INVENTOR.
SAMUEL K. WELLMAN
BY Kwis Hudson & Kent
ATTORNEYS Patented Feb. 29, 1944

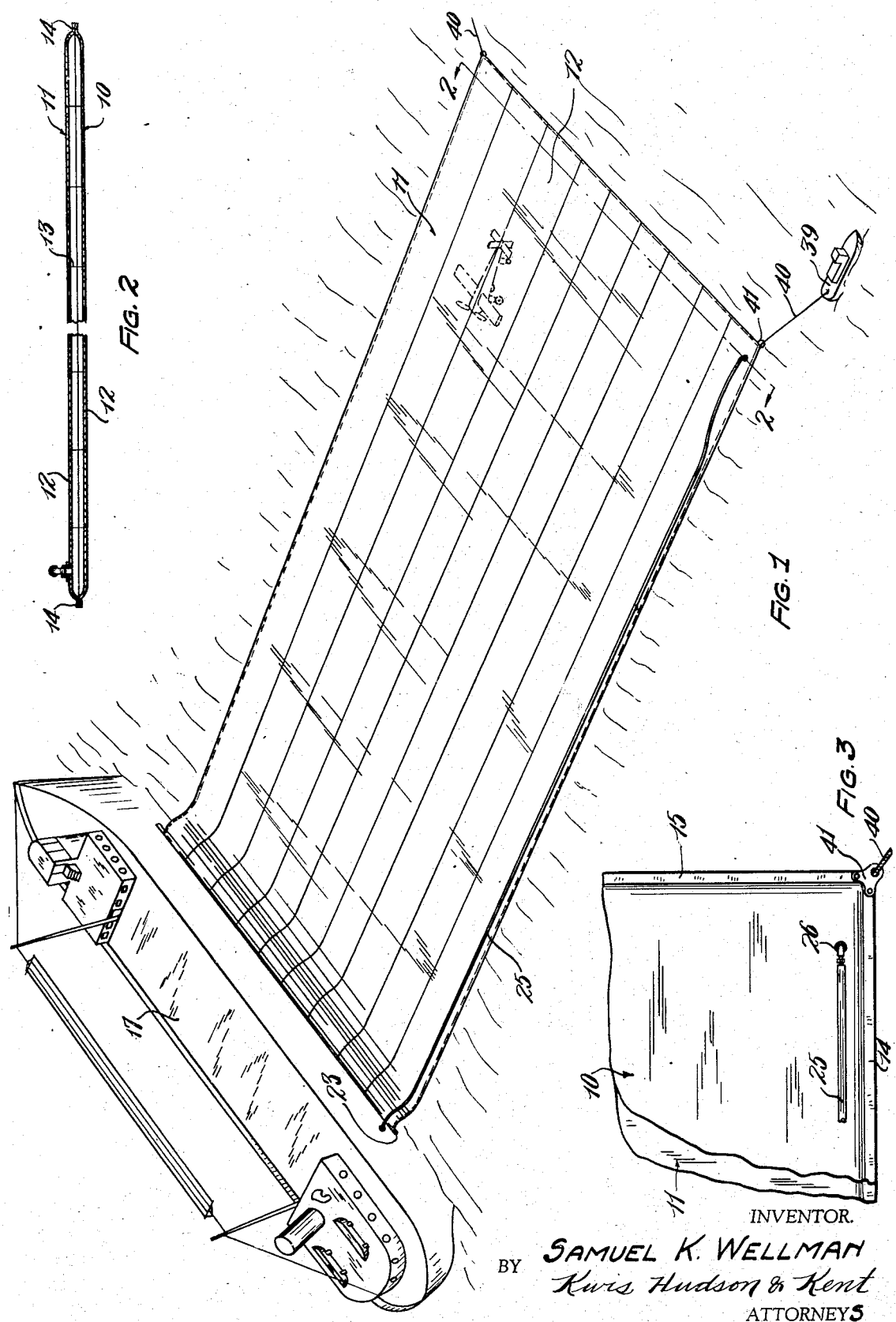

2,342,773

UNITED STATES PATENT OFFICE 2,342,773

LANDING PLATFORM FOR AIRPLANES

Samuel K. Wellman, Cleveland Heights, Ohio

Application March 28, 1942, Serial No. 436,563

12 Claims. (Cl. 114—43.5)

This invention relates to a platform especially adapted for the landing thereon and the taking off therefrom of aircraft. More particularly the invention relates to a platform which can be transported by ship or other suitable means to any desired destination and then after being extended to operative position and inflated will float with sufficient stability to allow aircraft to land thereon and take off therefrom.

The use of certain types of military aircraft is limited by their relatively short operating radius. The zone of operations of such aircraft, heretofore, has been determined by the location and presence of suitable landing fields open to their use or by the availability of ships, such as aircraft carriers, equipped with deck-supported landing platforms.

The principal object of the invention is to enable aircraft of relatively short operating radius to operate at substantial distances from their regular bases, whether fixed landing fields or aircraft carriers provided with deck-supported landing platforms.

Another object of the present invention is to provide a platform for the landing thereon and the taking off therefrom of aircraft and which platform can be effectively contained in and transported by a ship when the platform is not in use and then at any desired location or destination can be quickly extended from the ship and inflated and floated on the water with the requisite stability.

A further object is to provide a platform such as specified in the last named object and which is so formed that when not in use it can be rolled up on a reel.

Another object is to provide a platform of the character referred to and which does not require major structural alterations in a ship in adapting and equipping it for the purposes of transporting the platform when not in use and in extending the platform and supporting the same during use.

Another object is to provide a platform for aircraft which can be readily constructed and quickly installed in ships of conventional design.

Another object is to provide a floating platform of the character referred to and which platform is so constructed that it will float on water and allow the taking off therefrom or the landing thereon of aircraft when the platform is inflated at a relatively low pressure.

Another object is to provide a platform of the character referred to, which can be extended from the side of a vessel and will float on the water in the lee of the vessel.

Further and additional objects and advantages not expressly referred to above will become apparent hereinafter during the following detailed description of an embodiment of the invention.

Referring to the accompanying drawings,

Fig. 1 is a perspective view of a ship or vessel equipped with a platform embodying the invention and shows said platform extended from the side of the ship and floating on the water in the lee of the ship.

Fig. 2 is a transverse sectional view through the platform in its inflated condition and is taken substantially on line 2—2 of Fig. 1, looking in the direction of the arrows.

Fig. 3 is a fragmentary top plan view of the platform shown in Fig. 1 and illustrates one of the outer corners of the platform with a portion of the top surface of the platform broken away to disclose the lower interior surface thereof and with the outer end of an air hose connected to the inflating fitting mounted on the platform near its outer end.

Fig. 4 is a somewhat diagrammatic horizontal longitudinal sectional view through the ship or vessel showing the platform in partially reeled-up condition and illustrating the mechanism for operating the reel and for inflating the platform.

Fig. 5 is a fragmentary transverse sectional view taken substantially on irregular line 5—5 of Fig. 4 looking in the direction of the arrows.

The platform embodying the invention comprises a lower sheet 10 and an upper sheet 11. The upper and lower sheets are of the same dimensions and are formed of suitable pliable thin gauge material possessing the requisite strength for the purposes required. Preferably the sheets are formed of thin gauge sheet steel which has the requisite strength but is sufficiently pliable to allow the platform to be wound up on a reel and when so wound to present a roll which is not of excessive diameter. The upper and lower sheets may each be formed of a plurality of elongated strips 12 of thin gauge steel with the adjacent longitudinal edges of the strips contacting each other and secured together throughout their length by suitable means such as butt welding as indicated at 13 in Fig. 2.

The upper sheet is placed on the lower sheet with the longitudinal edges and the end edges of both sheets in registration and then such edges are sealed and secured together by suitable means such as by welding. The interconnected longitudinal edges of the sheets are indicated at 14, while the interconnected outer end edges thereof are indicated at 15. It will be understood that the inner end edge of the platform which is not illustrated in the drawings, as it is mounted on the reel later to be referred to, is of the same construction as the outer end edge thereof.

The upper and lower sheets when united, as just explained constitute an inflatable enclosure. When the platform is not inflated the upper sheet 11 will lie against the lower sheet 10, but when the platform is inflated the upper and lower sheets will be slightly spaced apart as indicated in Fig. 2. The platform should be of sufficient width to impart stability thereto when the platform is floating on water. The platform should be of such length as to enable light aircraft, such as military pursuit or fighter planes to take off therefrom and land thereon.

As previously stated the platform in use is inflated. It is proposed to inflate the platform at a relatively low pressure, since the area of the platform thus inflated provides sufficient buoyancy to properly float the platform with the necessary stability to permit the landing thereon and the taking off therefrom of aircraft. Inasmuch as the platform is inflated at low pressure small leaks which might occur therein would not be serious since the escape of the low pressure air would be slow.

The manner in which the platform would be carried by a ship and extended therefrom is illustrated in a diagrammatic manner in the drawings, it being understood that various arrangements of reels, propelling mechanism therefor, as well as different apparatus for inflating the platform and different ways of extending the platform from a ship could be employed.

The inner end of the platform is connected to a suitable elongated reel 16 which, in the present illustration, is shown located below the main deck of a vessel 17 and rotatably mounted in suitable supports 18. The reel 16 extends lengthwise of the vessel and may be power driven at one or both ends by suitable power operated means. In the present illustration such means is shown only at one end of the reel and comprises a motor 19 on the spindle of which is a pinion 20 meshing with a gear 21 fixed to the extended end of the reel shaft 22. If necessary to do so suitable supporting means, such as rollers (not shown), may contact the underside of the rolled up platform intermediate the ends of the reel.

The platform may be extended from the reel through an elongated opening 23 formed in the hull of the ship. The opening 23 can be closed by a closure member 24 when the platform is completely wound on the reel 16. Although the reel 16 is shown mounted below the main deck and the platform is illustrated as extending from the reel through the elongated opening 23 in the hull of the vessel, it will be understood that the reel may be mounted on the main deck of the vessel and the platform extended therefrom over the side of the ship.

As previously stated, it is proposed to inflate the platform when the latter is extended from the reel and the ship and this may be done by means of an air hose 25 connected at its outer end to a suitable fitting 26 carried by the platform adjacent its outer end. The hose 25 may be reeved around a sheave 27 and extended therefrom into a storage receptacle 28 in which it may be coiled with its inner end connected to a source of supply of low pressure air such as a low pressure high volume blower 29 driven by a motor 30. The sheave 27, if necessary, may be driven by a motor 31 having a pinion 32 on its spindle which meshes with a gear 33 fixed on the shaft of the sheave, which latter is rotatably mounted in bearings formed by suitable supports 34. The hose 25 can be run out from the ship through an opening 35 in the hull and which opening ordinarily may be closed by a suitable port 36. The hose may be guided in its outward movement by rollers 37 and 38 mounted interiorly of the ship as shown in Fig. 5.

The ship 17 provided with the reel on which the platform is wound proceeds to a desired destination and anchors broadside to the wind. It will be understood that the ship will be anchored by suitable means to maintain its position as, for example, by both bow and stern anchors if necessary or by any other suitable means.

The closure member 24 is opened and the outer end 15 of the platform is passed through the opening 23. The outer end of the hose 25 is also passed out of the opening 35 and connected to the inflating fitting 26 carried by the platform. The platform may be unwound from the reel by the power operation of the latter alone or the unwinding thereof can be assisted by using small boats 38 connected by tow lines 40 to fittings 41 secured to each outer corner of the platform. The small boats and the tow lines 40 not only can be used to assist in unwinding the platform into operative position but they can also be employed to hold or guy the platform in position after it has been completely unwound. As the platform is unwound from the reel low pressure air is supplied thereto through the hose 25 to inflate the platform and enable it to float on the water in the lee of the vessel. The relatively large area of the platform and the inflated condition thereof provide the required buoyancy and stability to the platform and enables aircraft to land thereon or to take off therefrom. The platform and its carrying vessel can be used as a refueling relay station for aircraft of short operating radius to enable such craft to operate at distances from their regular bases. Also the vessel 17 may carry aircraft and the latter operates from the vessel itself as a base, taking off from and landing on the platform.

After the platform has been extended from the ship, inflated and used for the taking off or landing of airplanes, it may be rewound on the reel and the ship moved to another location. In rewinding the platform on the reel it is, of course, necessary to deflate the platform and the latter will be provided with suitable valve means for this purpose.

It will be understood that the platform is reeled toward the ship and wound up on the reel 16 at the same time that the hose 25 is pulled inwardly of the vessel and coiled in the receptacle 28. When the platform has been completely wound on the reel the closure member 24 and the port 36 may be closed and the vessel may proceed to a different destination.

It will be appreciated that substantially conventional cargo ships may readily be equipped with the reel and platform and this equipment can be utilized in extending the zone of operation of aircraft of limited operating radius. The invention is of great utility in war as it provides means whereby military craft of short operating radius can be used against the enemy at long distances from regular bases.

Although the longitudinal adjacent edges of the strips forming each sheet of the platform have been described herein as connected together by butt welding it will be understood that such edges could be secured together by lap welding or by some other means if desirable to do so.

It will be appreciated that in some instances it might be desirable to tow the platform to its destination rather than have it installed in a ship and such an arrangement is within the contemplation of the present invention.

In case the platform when wet proves slippery the landing surface thereof could be roughened or surfaced to provide greater traction for the landing gear of the aircraft using the platform. As an example of how this might be done, sand could be made to adhere to said landing surface of the platform.

Although a preferred embodiment of the invention has been illustrated and described herein it will be understood that the invention is susceptible of various modifications and adaptations within the scope of the appended claims.

Having thus described my invention, I claim:

1. In combination, a landing platform for aircraft and a ship for transporting said platform, said platform comprising an elongated, inflatable, hollow pliable body of a width substantially greater than the beam of the ship and arranged so that its transverse dimension extends longitudinally of the ship, means carried by said ship and connected to the inner end of said platform for receiving said platform when the latter is deflated and stored on said ship, said platform being extendable laterally of said ship to be inflated and floated for the purpose of permitting the landing thereon and the taking off therefrom of aircraft.

2. In combination, a landing platform for aircraft and a ship for transporting said platform, said platform comprising an elongated inflatable, hollow, pliable body of a width substantially greater than the beam of the ship and arranged so that its transverse dimension extends longitudinally of the ship, means carried by said ship and connected to the inner end of said platform for receiving said platform when the latter is deflated and stored on said ship, the hull of said ship being provided with an opening through which said platform may be extended laterally of the ship, said platform when thus extended and inflated possessing sufficient buoyancy to float and permit the landing thereon and the taking off therefrom of aircraft.

3. In combination, a landing platform for aircraft and a ship for transporting said platform, said platform comprising an elongated inflatable hollow pliable body of a width substantially greater than the beam of the ship, a reel carried by said ship and connected to the inner end of said platform and on which the latter is wound when deflated and not in use, said platform when unwound from said reel and extended away from said ship and inflated possessing sufficient buoyancy to float and permit the landing thereon and the taking off therefrom of aircraft.

4. In combination, a landing platform for aircraft and a ship for transporting said platform, said platform comprising an elongated inflatable hollow pliable body of substantial width and arranged so that its transverse dimension extends longitudinally of the ship, a reel carried by said ship and extending longitudinally thereof and connected to the inner end of said platform and upon which the latter when deflated may be wound, said platform when unwound from said reel and extended laterally of said ship and inflated possessing sufficient buoyancy to float and permit the landing thereon and the taking off therefrom of aircraft.

5. In combination, a landing platform for aircraft and a ship for transporting said platform, said platform comprising an inflatable hollow pliable body of thin gauge sheet metal and substantially greater in width than the beam of the ship, means carried by said ship and connected to the inner end of said platform for receiving the latter when the same is deflated and stored on said ship, said platform being extendable from said ship to be inflated and floated for the purpose of permitting the landing thereon and the taking off therefrom of aircraft.

6. In combination, a landing platform for aircraft and a ship for transporting said platform, said platform comprising an elongated inflatable hollow pliable body of substantial width and arranged so that its transverse dimension extends longitudinally of the ship, said platform being formed of thin gauge sheet metal, a reel carried by said ship and extending longitudinally thereof and connected to the inner end of said platform and upon which the latter may be wound, said platform when unwound from said reel and extended laterally of said ship and inflated possessing sufficient buoyancy to float and permit the landing thereon and the taking off therefrom of aircraft.

7. The combination defined in claim 6 and wherein power operated means is operatively connected with said reel to rotate the same.

8. The combination defined in claim 6 and wherein said ship is provided with means for inflating said platform.

9. The combination defined in claim 6 and wherein said ship and said platform are provided with cooperating means for inflating the latter and which means includes an air inlet device carried by said platform adjacent its outer end, an extendable conduit carried by said ship and provided at one end with means for connecting the conduit to said device, and means carried by said ship and connected to the other end of said conduit for supplying air under pressure thereto.

10. A platform of the character specified comprising superimposed upper and lower sheets of substantially the same dimensions and formed of thin gauge pliable sheet metal, the longitudinal and end edges of said sheets being secured and sealed together, each sheet being formed of a plurality of strips having their adjacent longitudinal edges secured together, and means for introducing air between said sheets to inflate said platform.

11. A platform of the character specified comprising superimposed upper and lower sheets of substantially the same dimensions and formed of thin gauge pliable sheet metal, the longitudinal and end edges of said sheets being secured and sealed together, each of said sheets being formed of a plurality of strips having their adjacent longitudinal edges welded together, and means for introducing air between said sheets to inflate said platform.

12. A platform of the character specified comprising superimposed upper and lower sheets of substantially the same dimensions and formed of thin gauge pliable sheet metal, the longitudinal and end edges of said sheets being welded together, each of said sheets being formed of a plurality of strips having their adjacent longitudinal edges welded together, and means for introducing air between said sheets to inflate said platform.

SAMUEL K. WELLMAN.